United States Patent [19]

Giuricich

[11] Patent Number: 5,221,301
[45] Date of Patent: Jun. 22, 1993

[54] MULTI-STAGE CYCLONE SEPARATOR SYSTEM WITH INTERMEDIATE MANIFOLD

[75] Inventor: Nicholas L. Giuricich, Dix Hills, N.Y.

[73] Assignee: Emtrol Corporation, Hauppauge, N.Y.

[21] Appl. No.: 967,797

[22] Filed: Oct. 28, 1992

[51] Int. Cl.⁵ ............................................. B01D 45/12
[52] U.S. Cl. .................... 55/345; 55/459.1; 422/147
[58] Field of Search ...................... 55/345, 349, 459.1; 422/147

[56] References Cited

U.S. PATENT DOCUMENTS

| | | |
|---|---|---|
| 2,728,642 | 12/1955 | Cunningham et al. .......... 422/147 X |
| 3,333,402 | 8/1967 | Kalen ..................................... 55/345 |
| 3,724,176 | 4/1973 | Vishnevsky et al. . |
| 3,982,902 | 9/1976 | Lortz . |
| 4,364,905 | 12/1982 | Fahrig et al. . |
| 4,460,391 | 7/1984 | Mueller et al. . |
| 4,547,341 | 10/1985 | Weber . |
| 4,728,348 | 3/1988 | Nelson et al. . |

Primary Examiner—Charles Hart
Attorney, Agent, or Firm—Robbins & Robbins

[57] ABSTRACT

A multi-stage cyclone separator apparatus is provided for separating particulates from gas in a particulate laden gas. The apparatus is particularly useful for separating particulates such as catalyst particles from hot refinery gas in fluid catalytic cracking reactors and regenerators. The apparatus makes economical use of space and provides for accommodation of stresses due to differential temperature expansion by providing a manifold or plenum chamber receiving partially cleaned outlet gases from a first stage of cyclone separators and providing an inlet therefore to a second stage of separators. The number of separators in each stage are independent of those in the other stage. By arrangement around the periphery of the intermediate manifold chamber and suspension from a top of the housing the separators in the different stages may be efficiently interfitted without interference from separator dip legs as well as providing support for the structure to accommodate thermal stresses.

15 Claims, 4 Drawing Sheets

MULTI-STAGE CYCLONE SEPARATOR SYSTEM WITH INTERMEDIATE MANIFOLD

BACKGROUND OF THE INVENTION

This invention relates to equipment for use in fluidized bed processes and more specifically to fluidize bed process vessels which utilize multi-stage arrangement of cyclone dust separation equipment, for example, Fluid Catalytic Cracking Unit reactors and regenerators. This separation equipment is used to separate particulates such as catalysts from hot gas.

In current practice in fluidized bed process vessels, multi-stage cyclone systems are widely used. These cyclone systems are usually in two stage arrangements with some installations utilizing three stages. In virtually all these set ups the number of cyclones, i.e., cyclone separators in each stage is the same, with each cyclone of a stage directly connected to a companion cyclone of another stage thus, forming an individual set, with no direct connection to any other cyclones in the system. The catalyst separated by the cyclones is conveyed to the bottom of the vessel through pipes called dip legs.

In recent years there has been a development of so called "Closed Cyclone" systems for FCC units. This type of system uses a design which minimizes contact time between hydrocarbon vapors and catalyst which results in enhanced productivity of the FCC refining process. Therefore, many refiners who have existing facilities desire to make use of this procedure by modifying their facilities to adopt this technology. New FCC plants can also make use of this improvement in their initial design.

At this time these "Closed Cyclone" systems utilize two stage of cyclones, a "riser" cyclone stage followed by an additional "upper" cyclone stage which separate all but a residual amount of the catalyst before the hydrocarbon vapors leave the reactor vessel. In these systems, each riser cyclone is connected to a companion upper cyclone resulting in the same number of cyclones in each stage as already described.

In some vessels the space available to accommodate the desired cyclone system is restricted, particularly in vessel overall headroom, which can result in interference between the bottom of the upper cyclones and the top of the riser cyclones. Thus, in these circumstances it is desirable to minimize cyclone overall height. One way this can be accommodated is to utilize smaller diameter cyclones, which, of course, then requires use of more cyclones in parallel to maintain desired cyclone capacity.

Since each riser cyclone is directly connected to its companion cyclone, this normally compels the connected cyclones to be in close proximity of one another. In many vessels, this constraint can result in difficulties related to interferences among the cyclones; between the upper cyclone dip legs and the riser cyclones; between the upper cyclones and/or dip legs and the riser cyclone support structure. Also this constraint may require locations of the cyclones in such a manner which results in unacceptable slopes of the dip legs, endangering proper catalyst flow that is required to direct the separated catalyst to the lower portion of the vessel.

SUMMARY OF THE INVENTION

The present invention provides for unequaled flexibility in the selection of the number of cyclones, i.e., the number of cyclone separators in one stage is independent of the number of cyclones in the other stage. For example, the number of upper cyclones could be the same, greater or lesser than the number of riser cyclones.

The invention also provides the greatest possible flexibility in the choice of location for the upper cyclones, to permit their favorable position to avoid interferences and/or unfavorable dip leg slopes, since the constraint of direct connection to a specific companion riser cyclone is eliminated.

This invention provides, in many cases, an integrated design of components and support structure comprising the gas outlet manifold chamber to which the riser cyclones discharge, the duct work connecting the lower manifold to a second manifold chamber which directs gas to the upper cyclones, the upper cyclones, and the plenum chamber which receives the gases from the upper cyclones before the gas is discharged from the vessel housing. This entire integrated structure is supported from the vessel head by a welded connection to the plenum skirt. The support from the top portion of the vessel accommodates movement due to differential thermal expansion without inducing excessive stresses into the structure.

In addition, since the manifold or chamber arrangement permits the upper cyclones flexibility in location, not constrained by connection to a specific companion cyclone, avoidance of interferences among components is greatly facilitated.

The above features are objects of this invention. Further objects will appear in the detailed description which follows and will be otherwise apparent to those skilled in the art.

For purpose of illustration of this invention, a preferred embodiment is shown and described hereinbelow and in the accompanying drawing. It is to be understood that this is for the purpose of example only and that the invention is not limited thereto.

IN THE DRAWINGS

DESCRIPTION OF THE INVENTION

Figure 1:
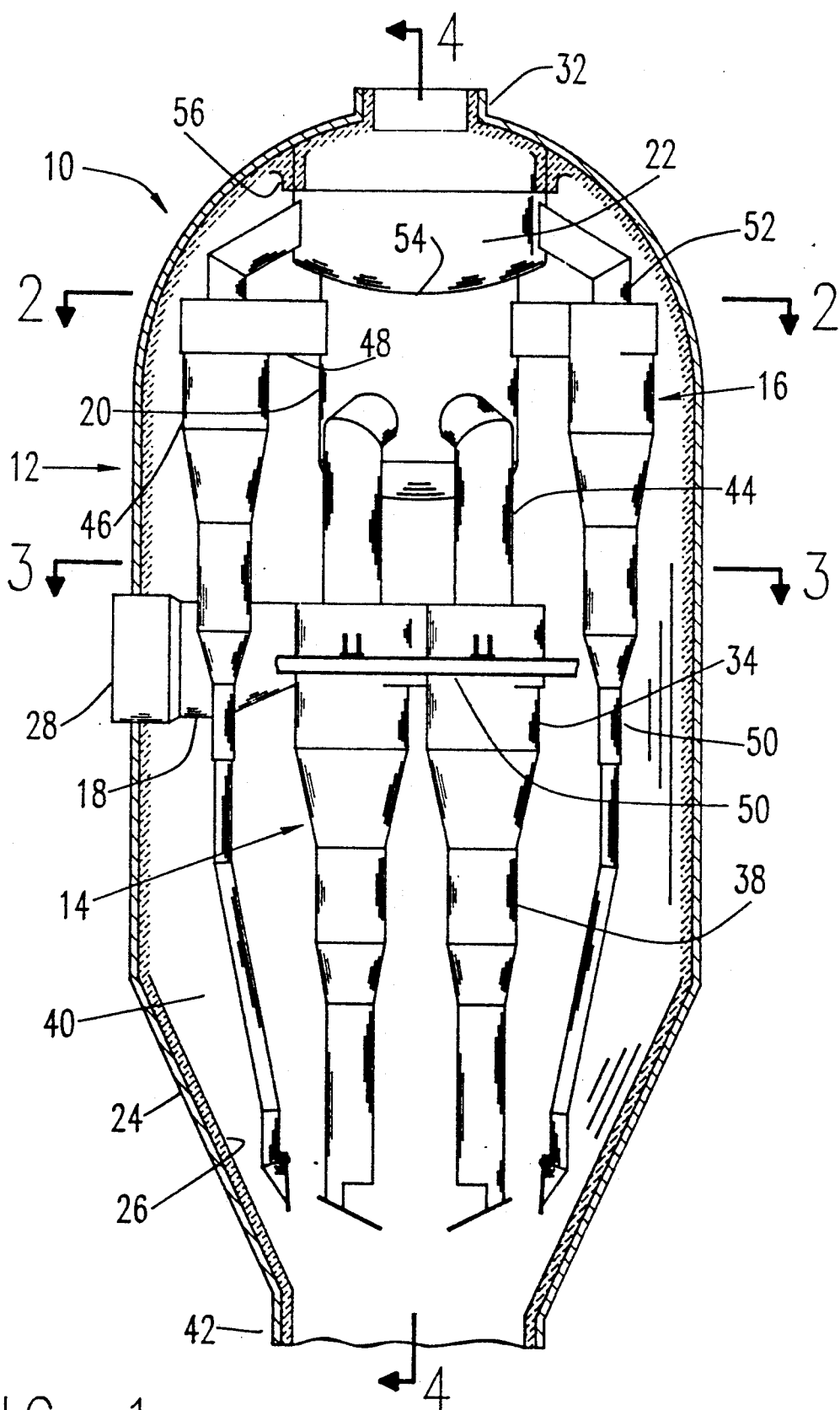
FIG. 1 is a partly full bodied view of the multi-stage cyclone separators and in vertical section taken on the axis of the housing.

The apparatus of this invention is generally indicated by the reference numeral 10 in FIGS. 1 through 4. It is comprised of a housing 12 within which are supported a plurality of cyclone separators typified by a riser cyclone separator stage 14 and an upper cyclone separator stage 16. An inlet chamber 18 feeds particulate laden gas to the first separator stage 14 while an intermediate chamber 20 receives partially cleaned gas from the first riser stage of cyclones or separators and feed this gas to the second upper stage of separators. A final plenum chamber 22 receives further cleaned gas from the second stage of separators for discharge to an outlet for the housing. The inlet 18 shown is horizontally oriented and penetrates the vertical wall of the vessel. It is to be understood that many other locations and/or orientations for the inlet are possible; for example, through the lower portion of the vessel in a vertical or oblique manner.

The housing 12 may preferably be that for a reactor or regenerator employed in fluid catalytic cracking units or as desired may be any type of housing employed for separation of particulates from hot gases or the like. It is comprised of a steel shell 24 and a refractory liner 26 to withstand temperatures in the neighborhood of 1400° F. For separation of particulates in waste gas or the like where a heat exchanger is employed in advance of the housing to reduce the temperature of the incoming gas to temperature in the neighborhood of 600° F., the refractory lining may not be needed.

The housing 12 is provided with an inlet 28 at the side of the housing leading to inlet chamber 18 communicating with the first riser stage of separators 14. An outlet 32 at the top of the housing opening to the plenum chamber 22 provides for discharge of the separated gas.

The first stage 14 of separators is comprised of a plurality, four for example, as shown in the drawings of cyclone separators 34 arranged around the axis of the housing. Each of the separators has an inlet 36 opening into the inlet chamber or manifold 18. Each of the separators has a dip leg 38 of conventional construction in the interior chamber 40 of the housing for discharging particulates to the bottom 42 of the housing for collection as desired. An outlet 44 for partially cleaned gas for each of the separators leads to the intermediate chamber or manifold 20 as best shown in FIGS. 1, 2 and 4.

The second or upper stage of cyclone separators is comprised of a plurality of somewhat smaller separators 46 grouped around the periphery of the chamber 20. These separators are designed for separation of smaller particulates not separated in the first stage and which are entrained in the gas passing through the first stage of separators to the chamber 20. These separators which, for example, may be seven in number, each have inlets 48 receiving gas and entrained fine particulates from the chamber 20. These separators which like the separators 34 are conventional in construction have dip legs 50 extending to the bottom 42 of the housing for discharge through the housing as desired. The bottom of the housing may be closed in a conventional matter and form no part of this invention, per se.

Figure 2:
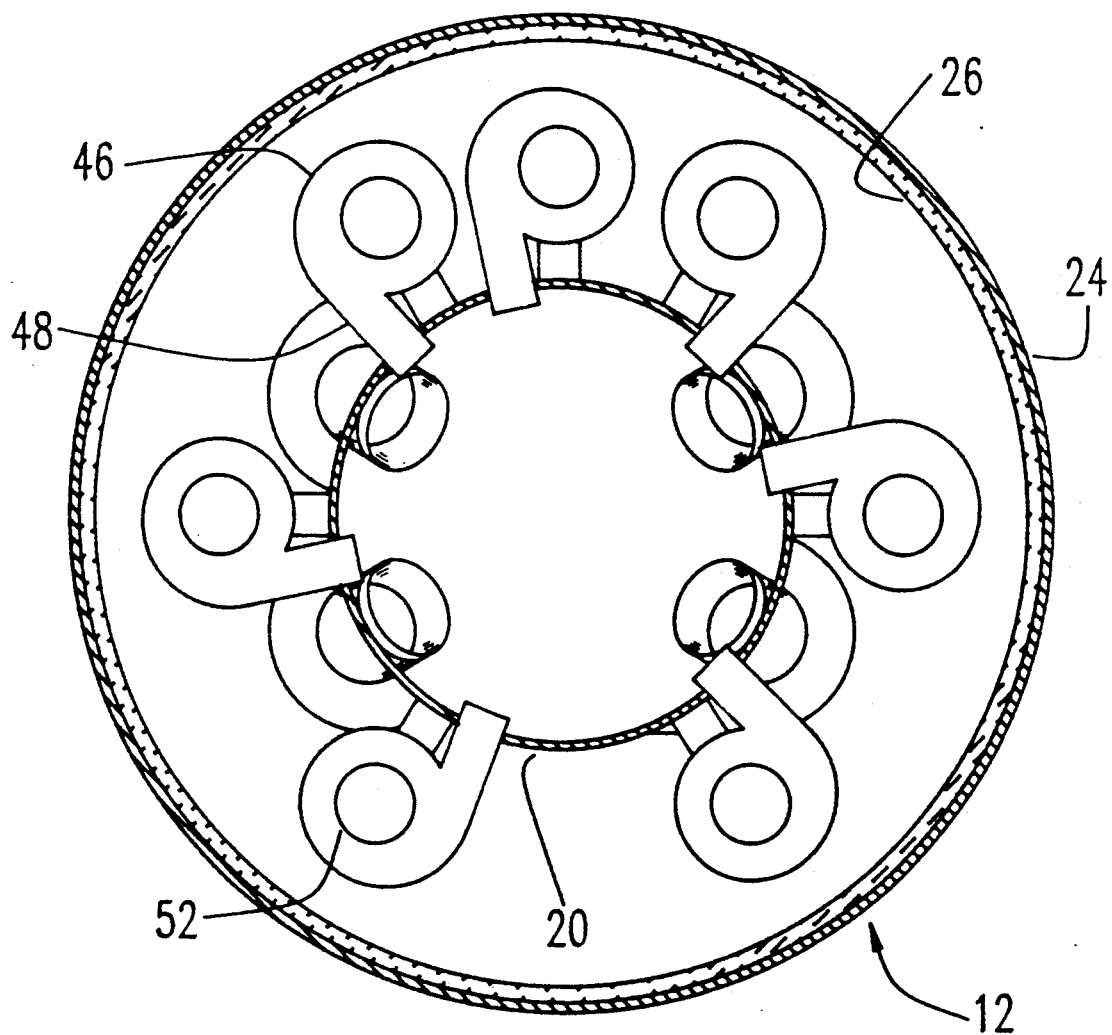
FIG. 2 is a view in section taken on line 2—2 of FIG. 1.
Figure 4:
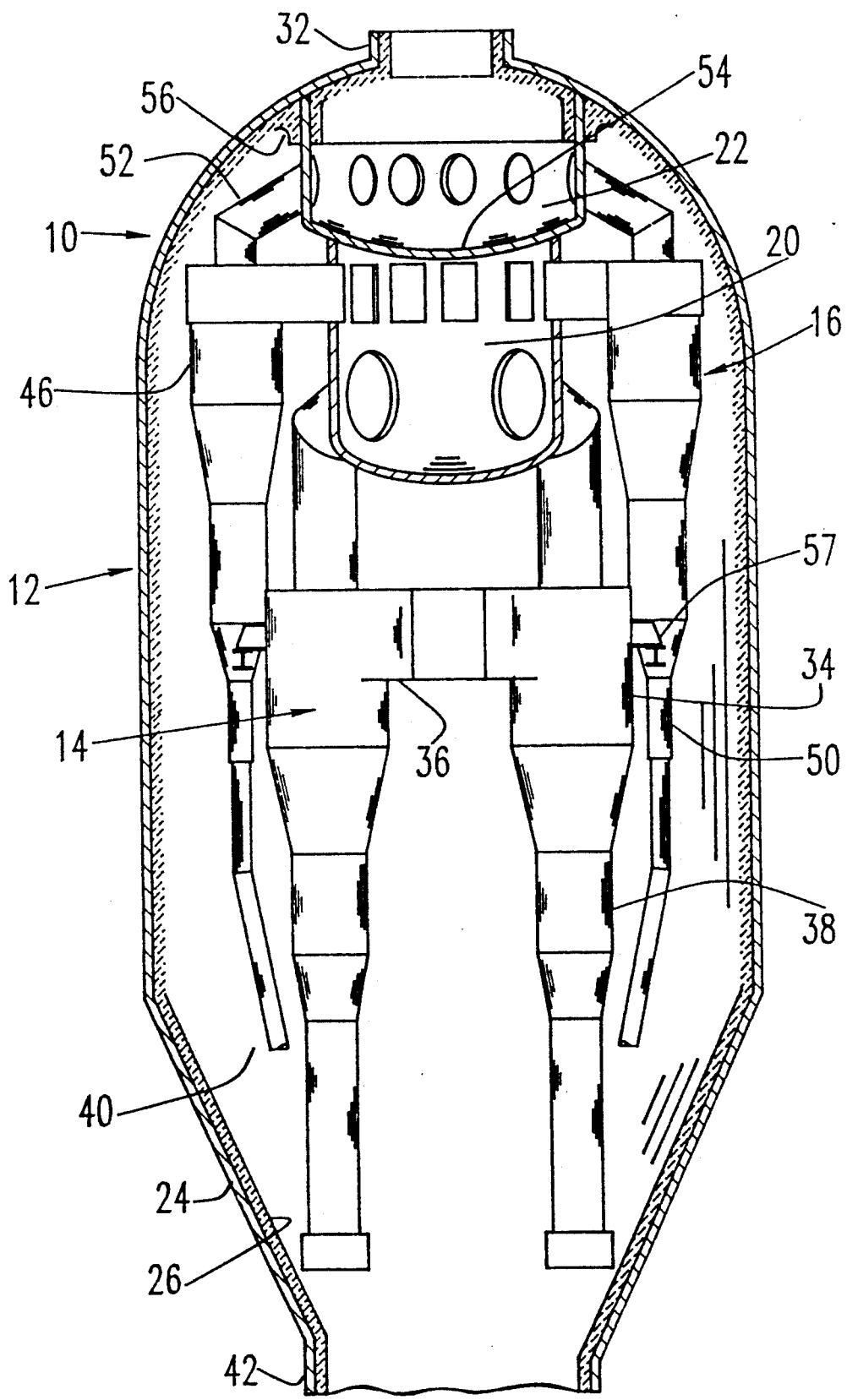
FIG. 4 is a view in section taken on line 4—4 of FIG. 1.

The separators 46 are further provided with outlets 52 which lead to the outlet plenum chamber 22 as best shown in FIGS. 1 and 4. The cleaned gas is then discharged from this chamber to the outlet 32 for any further treatment, use or venting as desired.

In the construction of the apparatus and the multi-stage cyclone separator system economical use of headroom is achieved by the vertical and coaxial arrangement of the intermediate chamber 20 and the plenum chamber 22. In this manner a common wall 54 is used to constitute a top wall of the chamber 20 and a bottom wall of the chamber 22. The circular or round construction further facilitates the grouping of the first and second stages of the separators around the periphery of the chambers. Maximum utilization of vertical headroom is also achieved since the outlets 44 of the first stage of separators may without interference be positioned closely adjacent to the inlets 48 of the second stage of separators as well shown in FIGS. 1 and 4 and may even be located at the same level since the separators in the two stages are independent of each other.

Figure 3:
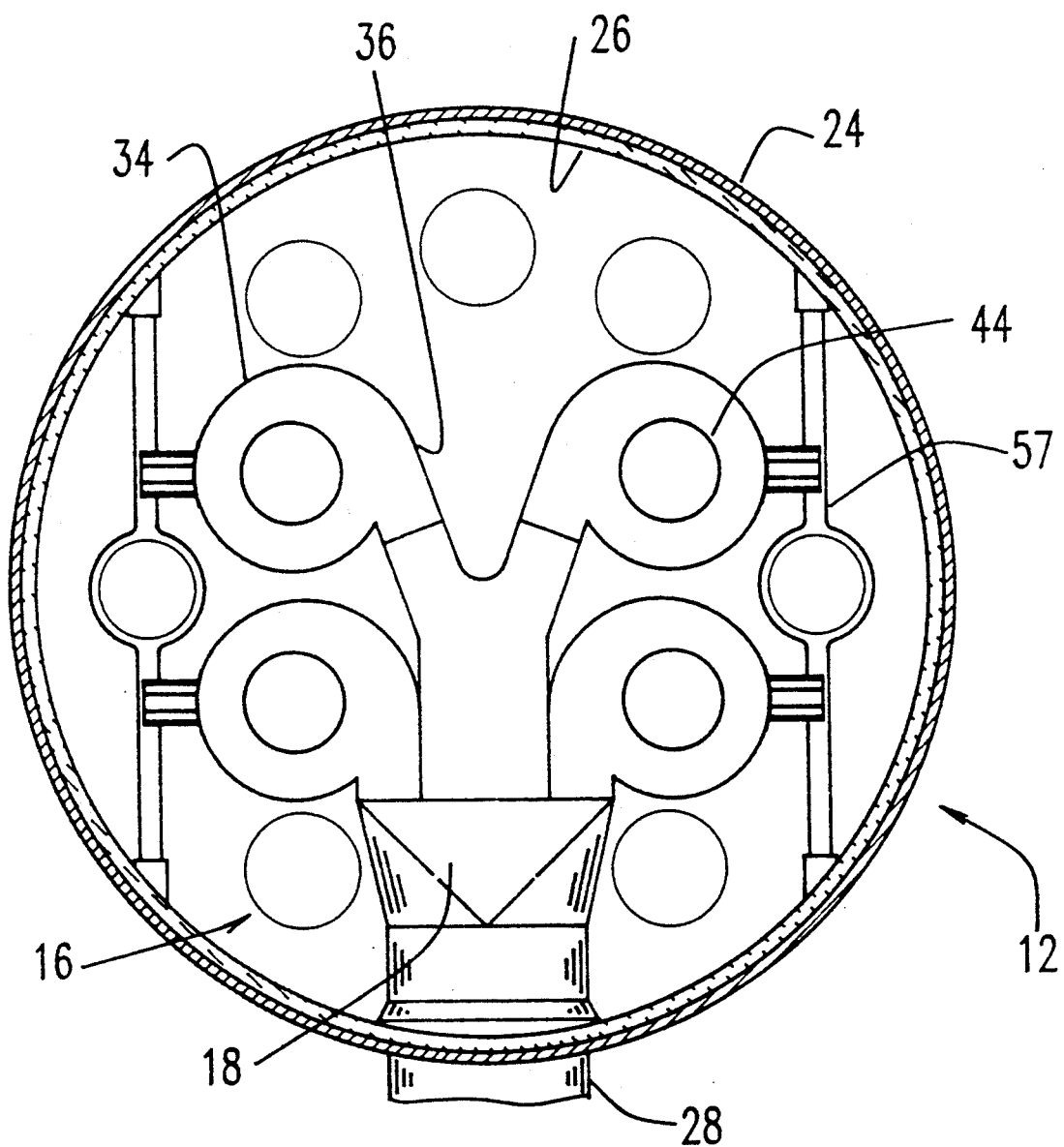
FIG. 3 is a view in section taken on line 3—3 of FIG. 1.

Further, by the physical support shown in FIGS. 1 and 4, the entire multi stage separator system with stages 14 and 16 and the chambers 20 and 22 may be supported from the top of the housing. This support may be provided by the support 56 of the chamber 22 to the top of the housing. The entire structure comprising the various chambers and cyclone separators are then free to expand and contract within the interior chamber 40 of the housing. In cases where there is a need or desire to mechanically separate the first stage separator stage 14 from direct connection to the second stage separator stage 16, the support of each stage can be independent instead of support of the entire structure as described above. Thus, the first stage separator stage 14 could be supported from structural elements 57 which in turn are supported from the housing 12. This is shown in FIGS. 1, 3 and 4.

The multi stage separator system of this invention may be advantageously employed in new construction for efficient separation of particulates from particulate laden hot gases. It may also be very desirably employed in existing structures using existing housings to replace old separator systems where headroom space is limited. The use of the chambers or manifolds and concentric and peripheral grouping of the multi stage separator systems provides efficient utilization of the existing space limitations.

Various changes and modifications may be made within this invention as will be apparent to those skilled in the art. Such changes and modifications are within the scope and teaching of this invention as defined in the claims appended hereto.

What is claimed is:

1. Apparatus for receiving hot gas and particulates and multi-stage cyclone separators for separating particulates and hot gas, said apparatus comprising a housing having an inlet for said hot gas and particulates, a first chamber receiving said hot gas and particulates, a first stage of cyclone separator means having means communicating with said first chamber, a second chamber having means receiving separated hot gas and entrained particulates from said first stage of cyclone separator means, and a second stage of cyclone separator means having means communicating with said second chamber, the first and second stages of cyclone separator means being provided in each stage with cyclone separators which are independent from the cyclone separators in the other stage and which may vary in number in each of the stages.

2. The apparatus of claim 1 in which a third chamber is provided having means receiving separated gas from said second stage of cyclone separator means.

3. The apparatus of claim 1 in which the first and second chambers are freely supported from a top portion of the housing to accommodate vertical and horizontal expansion.

4. The apparatus of claim 1 in which the first and second chambers and first and second stages of cyclone separator means are freely supported from top portion of the housing to accommodate vertical and horizontal expansion.

5. The apparatus of claim 3 in which said first and second chambers are disposed axially within said housing and concentrically within said housing.

6. The apparatus of claim 4 in which said first and second chambers are disposed axially within said housing and concentrically within said housing and separated from an interior wall of the housing by an interior chamber and said first and second cyclone separator means are disposed in said interior chamber.

7. The apparatus of claim 1 in which said first stage of cyclone separator means comprises a plurality of cyclone separators arranged around an exterior periphery of said second chamber and said second stage of cyclone separator means comprises a plurality of cyclone separators similarly disposed around the exterior periphery of said second chamber.

8. The apparatus of claim 7 in which the cyclone separators in both the first and second stages of said cyclone separator means have a vertical axis and downwardly depending dip legs receiving separated particulates from said cyclone separators.

9. The apparatus of claim 2 in which said first stage of cyclone separator means comprises a plurality of cyclone separators arranged around an exterior periphery of said second chamber and said second stage of cyclone separator means comprise a plurality of cyclone separators disposed around the exterior periphery of said second chamber and said second and third chambers have a common wall defining a top wall of said second chamber and a bottom wall of said third chamber.

10. The apparatus of claim 7 in which said second chamber is generally cylindrical and has a vertical axis substantially coaxial with a vertical axis of said housing.

11. The apparatus of claim 7 in which the first and second chambers are freely supported from a top portion of the housing to accommodate vertical and horizontal expansion.

12. The apparatus of claim 7 in which the first and second chambers and first and second stages of cyclone separator means are freely supported from top portion of the housing to accommodate vertical and horizontal expansion.

13. The apparatus of claim 1 in which said second chamber has a common top wall with said housing defining a top wall of said chamber and an interior top wall of said housing.

14. The apparatus of claim 13 in which an outlet is provided for cleaned gas from said second chamber in a central portion of said top wall of the housing.

15. The apparatus of claim 7 in which the cyclone separators in the first stage of cyclone separators have outlets for partially cleaned gas communicating with inlets in a vertical wall of said second chamber and the cyclone separators in the second stage of cyclone separators have inlets communicating with outlets in said vertical wall of said second chamber.

* * * * *